United States Patent
Klaassens et al.

(10) Patent No.: US 7,125,609 B2
(45) Date of Patent: Oct. 24, 2006

(54) EPOXY MODIFIED ORGANOPOLYSILOXANE RESIN BASED COMPOSITIONS USEFUL FOR PROTECTIVE COATINGS

(75) Inventors: Lars Ivar Klaassens, AP Haarlem (NL); Jan De Jong, VC Zaandam (NL); Henk Van Der Poel, VL Voorhout (NL)

(73) Assignee: Sigmakalon Services B.V., Uithoorn (NL)

( * ) Notice: Subject to any disclaimer, the term of this patent is extended or adjusted under 35 U.S.C. 154(b) by 201 days.

(21) Appl. No.: 10/513,090

(22) PCT Filed: Apr. 30, 2003

(86) PCT No.: PCT/EP03/04514

§ 371 (c)(1),
(2), (4) Date: Oct. 29, 2004

(87) PCT Pub. No.: WO03/093368

PCT Pub. Date: Nov. 13, 2003

(65) Prior Publication Data

US 2005/0154170 A1    Jul. 14, 2005

(30) Foreign Application Priority Data

May 3, 2002   (EP) ............................... 024477080

(51) Int. Cl.
*B32B 9/04* (2006.01)
(52) U.S. Cl. ...................... 428/447; 428/413; 524/588; 525/476; 528/27; 528/28
(58) Field of Classification Search ..................... None
See application file for complete search history.

(56) References Cited

U.S. PATENT DOCUMENTS 5,804,616 A    9/1998  Mowrer et al.
6,525,159 B1 *  2/2003  Okuhira et al. ............... 528/26

FOREIGN PATENT DOCUMENTS

| DE | 41 29 000 | 3/1993 |
|---|---|---|
| DE | 199 35 471 | 2/2001 |
| JP | 2-311551 | * 12/1990 |
| WO | WO 01/02506 | 1/2001 |

OTHER PUBLICATIONS

International Search Report completed Jul. 28, 2003 and issued to a related foreign application.

* cited by examiner

*Primary Examiner*—Marc S. Zimmer
(74) *Attorney, Agent, or Firm*—Knobbe, Martens, Olson & Bear, LLP

(57) ABSTRACT

The present invention relates to an epoxy modified polysiloxane composition obtainable by combining the following ingredients:—a polysiloxane of formula (1), wherein each $R^1$ is independently selected from hydroxy, alkyl, aryl or alkoxy radicals having up to six carbon atoms, each $R^2$ is independently selected from hydrogen, alkyl or aryl radicals having up to six carbon atoms and, wherein n is selected so that the molecular weight for the polysiloxane is in the range of from about 400 to 10,000; with formula (1)—an epoxy resin having more than one 1,2-epoxy groups per molecule with an epoxy equivalent weight in the range of from 100 to about 5,000; and—an amino hardener component having active hydrogens able to react with epoxy groups in the epoxy resin to form polymers containing hydroxyl groups, which are able to react with the silanol groups of hydrolyzed polysiloxane to form a polymer network, wherein the epoxy chain polymers and polysiloxane polymers polymerize to form a cured epoxy modified polysiloxane polymer composition.

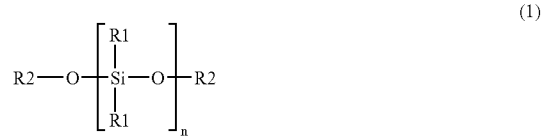

(1)

24 Claims, 2 Drawing Sheets

EPOXY MODIFIED ORGANOPOLYSILOXANE RESIN BASED COMPOSITIONS USEFUL FOR PROTECTIVE COATINGS

RELATED APPLICATIONS

This application is the U.S. National Phase under 35 U.S.C. § 371 of International Application PCT/EP03/04514, filed Apr. 30, 2003, which claims priority of EP 02447080.9, filed May 3, 2002.

FIELD OF THE INVENTION

This invention relates to epoxy modified polysiloxane resin based compositions useful for protective coatings and the like having improved flexibility.

BACKGROUND

Epoxy coating materials are well known and have gained commercial acceptance as protective and decorative coatings for steel, aluminum, galvanized steel and concrete in maintenance, marine, construction, architectural, aircraft and product finishing markets. Epoxy-based coatings possess many properties which make them desirable as coating materials. They are readily available and are easily applied by a variety of methods including spraying, rolling and brushing. They adhere well to steel, concrete and other substrates, have low moisture vapor transmission rates and act as barriers to water, chloride and sulfate ion ingress, provide excellent corrosion protection under a variety of atmospheric exposure conditions and have good resistance to many chemicals and solvents. The basic raw materials used to prepare these coatings generally comprise as essential components (a) an epoxy resin, (b) a hardener and (c) a pigment or filler component. Epoxy-based coatings generally show excellent protective properties but a considerable drawback is the limited gloss and color retention when atmospherically exposed.

Increasing awareness about environment and health and safety for human beings calls for extra attention in the preparation of safe paints. Increasing strictness of environmental rules demand a decrease of the emission of harmful solvents. Paint systems with low VOC contents are required. A currently world-wide wanted VOC level is VOC<250 g/L with respect to application viscosity.

Several paint manufacturers recently developed high solids (HS) paint systems with lower VOC contents to cope with environmental rules and regulations. Examples of these coatings in this respect are the commercially widely accepted protective and decorative isocyanate-cured polyurethane coatings. The 2-pack isocyanate-cured polyurethane coatings combine a high potential in gloss and color retention, good chemical resistance and good mechanical properties. Nowadays in some countries, the use of isocyanates is not allowed anymore because of safety and health regulations. There is an urge to replace these isocyanate cured polyurethane coatings by non-isocyanate coatings (NISO). However, from high to medium VOC content NISO coatings commercially available at present perform considerably less compared to the polyurethane finishes.

Using the common binder technologies to reformulate the existing NISO coatings into low VOC versions has been shown to be very difficult, as it requires the development of new polymers and curing processes to accomplish this task.

There is an urgent need for NISO coatings having low VOC content, good flexibility and the mechanical and chemical resistance properties of epoxy or polyurethane based paintings.

Epoxy-polysiloxane based compounds are known from U.S. Pat. Nos. 5,618,860 and 5,275,645, which describe 2-pack glossy epoxy-polysiloxane compositions. Although having good gloss and color retention properties and having very good chemical resistance they tend to be rather hard and brittle. As finish coating on complex structural steel where a higher flexibility is required they are not suitable. Besides, the shrink stresses during curing are generally too high for application on weaker substrates like concrete and low cohesive coating.

Thus, while epoxy-polysiloxane based coating materials have gained commercial acceptance, the need nevertheless remains for epoxy-polysiloxane based materials with improved mechanical and chemical resistance, and more in particular improved resistance to mechanical abuse. Coating materials with improved chemical, corrosion, impact and abrasion resistance are needed for both primary and secondary chemical containment structures, for protecting steel and concrete in chemical, power generation, rail car, sewage and waste water treatment, and paper and pulp processing industries.

In particular known epoxy-polysiloxane coatings show a tendency to crack on complex steel structures. Cracking tendency occurs frequently at local areas, such as corner joints where higher film thicknesses are mainly present.

A main object of the present invention is therefore to provide an epoxy-modified polysiloxane coating composition, which is high solid, has low VOC content and is NISO. It is another object to provide an epoxy-modified polysiloxane composition having improved flexibility and which does not show this cracking tendency, without compromising other properties like chemical or mechanical resistance and hardness development.

SUMMARY OF THE INVENTION

An epoxy modified polysiloxane composition is prepared, according to principles of this invention, by combining the following ingredients:

a polysiloxane of formula (1) with:

wherein each $R^1$ is independently selected from the group comprising hydroxy, alkyl, aryl and alkoxy radicals having up to six carbon atoms, each $R^2$ is independently selected from the group comprising hydrogen, alkyl and aryl radicals having up to six carbon atoms and, wherein n is selected so that the molecular weight for the polysiloxane is in the range of from about 400 to 10,000;

an epoxy resin having more than one 1,2-epoxy groups per molecule with an epoxy equivalent weight in the range of from 100 to about 5,000; and an amino hardener component having active hydrogens able to react with epoxy groups in the epoxy resin to form polymers containing hydroxyl groups, which are able to react with the silanol groups of hydrolyzed polysiloxane to form a polymer network, wherein the epoxy chain polymers and polysiloxane polymers polymerize to form a cured epoxy modified polysiloxane polymer composition.

The epoxy modified polysiloxane composition is prepared by using in the range of from about 10 to 80% by weight polysiloxane, 10 to 50% by weight of the epoxy resin ingredient, a stoichiometric amount of the amino hardener from 0.5 to 1.5 relative to the epoxy groups, and optionally up to about 5% by weight catalyst.

It is assumed that the above-identified ingredients react to form a network composition that comprises a continuous phase epoxy-polysiloxane copolymer. Epoxy modified polysiloxane compositions of this invention display improved flexibility as well as improved chemical and corrosion resistance when compared to conventional epoxy resin based coatings.

DETAILED DESCRIPTION

As used herein, the term "independently selected" indicates that the each radical R so described, can be identical or different. For example, each $R^1$ in polysiloxane of formula (1) may be different for each value of n, and within each unit of said polysiloxane.

As used herein, the term "alkyl", alone or in combination, means straight and branched chained saturated hydrocarbon radicals containing from 1 to 10 carbon atoms, preferably from 1 to 8 carbon atoms, more preferably 1-6 carbon atoms. Examples of such radicals include methyl, ethyl, n-propyl, isopropyl n-butyl, isobutyl, sec-butyl, tert-butyl, 2-methylbutyl, pentyl, iso-amyl, hexyl, 3-methylpentyl, octyl and the like.

The term "alkoxy" or "alkyloxy", alone or in combination, means alkyl ether radical wherein the term alkyl is as defined above. Examples of suitable alkyl ether radicals include methoxy, ethoxy, n-propoxy, isopropoxy, n-butoxy, iso-butoxy, sec-butoxy, tert-butoxy, hexanoxy and the like.

The term "alkylene", alone or in combination, defines bivalent straight and branched chained saturated hydrocarbon radicals containing from 1 to 10 carbon atoms, preferably from 1 to 8 carbon atoms, more preferably 1-6 carbon atoms such as, for example, methylene, ethylene, propylene, butylene, pentylene, hexylene and the like.

The term "alkynyl", alone or in combination, defines straight and branched chained hydrocarbon radicals having from 2 to 10 carbon atoms containing at least one triple bond, more preferably from 2 to about 6 carbon atoms. Examples of alkynyl radicals include ethynyl, propynyl, (propargyl), butynyl, pentynyl, hexynyl and the like.

The term "aminoalkylene" means a bivalent alkylene amine radical, wherein the term "alkylene" is defined as above. Examples of aminoalkylene radicals include aminomethylene ($—CH_2NH—$), aminoethylene ($—CH_2CH_2NH—$), aminopropylene, aminoisopropylene, aminobutylene, aminolsobutylene, aminohexylene and the like.

The term "aryl" alone or in combination, is meant to include phenyl and naphtyl which both may be optionally substituted with one or more substituents independently selected from alkyl, alkoxy, halogen, hydroxy, amino, nitro, cyano, haloalkyl, carboxy, alkoxycarbonyl, cycloalkyl, heterocycle, amido, optionally mono- or disubstituted aminocarbonyl, methylthio, methylsulfonyl, and phenyl optionally substituted with one or more substituents selected from alkyl, alkyloxy, halogen, hydroxy, optionally mono- or disubstituted amino, nitro, cyano, haloalkyl, carboxyl, alkoxycarbonyl, cycloalkyl, heterocycle, optionally mono- or disubstituted aminocarbonyl, methylthio and methylsulfonyl; whereby the optional substituents on any amino function are independently selected from alkyl, alkyloxy, heterocycle, heterocycloalkyl, heterocyclooxy, heterocyclooxyakyl, phenyl, phenyloxy, phenyloxyalkyl, phenylalkyl, alkyloxycarbonylamino, amino, and aminoalkyl whereby each of the amino groups may optionally be mono- or where possible di-substituted with alkyl. Examples of aryl includes phenyl, p-tolyl, 4-methoxyphenyl, 4-(tert-butoxy)phenyl, 3-methyl-4-methoxyphenyl, 4-fluorophenyl, 4-chlorophenyl, 3-nitrophenyl, 3-aminophenyl, 3-acetamidophenyl, 4-acetamidophenyl, 2-methyl-3-acetamidophenyl, 2-methyl-3-aminophenyl, 3-methyl-4-aminophenyl, 2-amino-3-methylphenyl, 2,4-dimethyl-3-aminophenyl, 4-hydroxyphenyl, 3-methyl-4-hydroxyphenyl, 1-naphthyl, 2-naphthyl, 3-amino-1-naphthyl, 2-methyl-3-amino-1-naphthyl, 6-amino-2-naphthyl, 4,6-dimethoxy-2-naphthyl and the like.

The term "cycloalkyl" alone or in combination, means a saturated or partially saturated monocyclic, bicyclic or polycyclic alkyl radical wherein each cyclic moiety contains from about 3 to about 8 carbon atoms, more preferably from about 3 to about 7 carbon atoms. Examples of monocyclic cycloalkyl radicals include cyclopropyl, cyclobutyl, cyclopentyl, cyclohexyl, cycloheptyl, cyclodecyl and the like. Examples of polycyclic cycloalkyl radicals include decahydronaphthyl, bicyclo [5.4.0] undecyl, adamantyl, and the like.

Epoxy modified polysiloxane compositions are prepared, according to principles of this invention, by combining;
(a) a base component comprising polysiloxane of formula (1) and an epoxy resin having more than one 1,2-epoxy groups per molecule with an epoxy equivalent weight in the range of from 100 to about 5,000; with
(b) an amino hardener component as described above;
(c) optionally a catalyst;
(d) optionally a pigment and/or filler component and
(e) optionally other additives.

With respect to the polysiloxane used to make up the base component, preferred polysiloxanes consist of those having the following formula (1):

(1)

wherein each $R^1$ is independently selected from the group comprising hydroxy, alkyl, aryl, and alkoxy radicals having up to six carbon atoms. Each $R^2$ is independently selected from the group comprising hydrogen, alkyl and aryl radicals having up to six carbon atoms. "n" is selected so that the polysiloxane ingredient has a molecular weight in the range of from about 400 to about 10,000. It is preferred that $R^1$ and $R^2$ comprise groups having less than six carbon atoms to facilitate rapid hydrolysis of the polysiloxane, which reaction is driven by the volatility of the alcohol analog product of the hydrolysis.

Examples of suitable polysiloxane ingredients include but are not limited to the alkoxy- and silanol-functional polysiloxanes. Suitable alkoxy-functional polysiloxanes include, but are not limited to: DC-3074 and DC-3037 from Dow Corning; Silres SY-550, and SY-231 from Wacker Silicone; and Rhodorsil Resin 10369 A, Rhodorsil 48V750, 48V3500 from Rhodia Silicones; and SF1147 from General Electrics. Suitable silanol-functional polysiloxanes include, but are not limited to, Silres SY 300, Silres SY 440, Silres MK and REN 168 from Wacker Silicone, Dow Corning's DC-840, DC233 and DC-431 HS silicone resins and DC-Z-6018 intermediate and Rhodia Silicones' Rhodorsil Resin 6407 and 6482 X.

In another embodiment, said epoxy modified polysiloxane composition may further comprise an organo-functional polysiloxane. Examples of suitable organo-functional polysiloxane include but are not limited to the organo-functional polysiloxanes described in JP 2000-319582, hereby incorporated by reference. Other suitable organo-functional polysiloxane, include but are not limited to the organo-functional polysiloxanes of formula (1') wherein each $R^{1'}$ is independently selected from the group comprising alkyl and aryl radicals, each $R^2$ is independently selected from the group comprising hydrogen, alkyl and aryl radicals, n is selected so that the molecular weight for the organ-functional polysiloxane is in the range of from 400 to 10,000, $R^3$ is a bivalent radical or $-O-R^3-(X)_z$ is hydroxy or alkoxy, z is 1, 2 or 3 and X is a reactive functional group for reacting with amine radicals and wherein 0 to 90% of $-O-R^3-(X)_z$ is hydroxy or alkoxy.

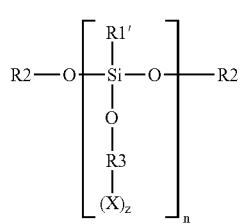

Said organo-functional polysiloxane of formula (1') has preferably the following stoichiometric formula

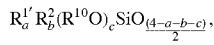

wherein each $R^{10}$ is independently selected from hydrogen, alkyl, or $-R^3-(X)_z$, and $R^1$, $R^2$, $R^3$, X and z have the same meaning as that defined above, a and b are each a real number from 0.0 to 2.0, more in particular from 0.1 to 2.0, c is a real number from 0.1 to 1.0, b/a is ranging from 0.2–2.0 and a+b+c is lower than 4, and wherein 0 to 90% of $-O-R^{10}$ is hydroxy or alkoxy. For example, suitable reactive functional group X may be selected from the group comprising unsaturated ester, imidyl, phtalimidyl, cyclocarbonate, acetylacetanoate, acetylalkylamide, epoxy, cyclic anhydride, carbamate, isocyanate, vinyl.

As used herein "a real number" refers to a number which is positive and includes integers and fractions of integers or any rational or irrational number. For example a is a real number from 0.0 to 2.0 means that a may assume any value within the range from 0.0 to 2.0.

The bivalent radical $R^3$ is preferably selected from the group comprising alkylene, alkenylene, arylene, aralkylene, aralkenylene, aryloxy, aminoalkylene, $-C(=O)-$, $-C(=S)-$, $-S(=O)_2-$, alkylene-$C(=O)-$, alkylene-$C(=S)-$, alkylene-$S(=O)_2-$, $-NR^4-C(=O)-$, $-NR^4-$ alkylene-$C(=O)-$, or $-NR^4-S(=O)_2$ whereby either the $C(=O)$ group or the $S(=O)_2$ group is attached to the $NR^4$ moiety, optionally substituted by alkyl, aryl, cycloalkyl, halogen, hydroxy, alkoxy, thioalkyl, amino, amino derivatives, amido, amidoxy, nitro, cyano, keto, acyl derivatives, acyloxy derivatives, carboxy, ester, ether, esteroxy, sulfonic acid, sulfonyl derivatives, sulfinyl derivatives, heterocycle, alkenyl or alkynyl, wherein $R^4$ is hydrogen, alkyl, alkenyl, aralkyl, cycloalkyl, cycloalkylalkyl, aryl, heterocycle or heterocycloalkyl.

In another embodiment of the present invention, the polysiloxane of formula (1) may be interchanged with the organo-functional polysiloxanes as described above.

A preferred epoxy modified polysiloxane composition comprises in the range of from 10 to 80% by weight polysiloxane. Using an amount of the polysiloxane ingredient outside of this range can produce a composition having inferior flexibility, weatherability and chemical resistance. A particularly preferred epoxy modified polysiloxane composition comprises approximately 30% by weight polysiloxane.

The base component comprises a blend of epoxy resin and polysiloxane. Epoxy resins useful in forming the epoxy modified polysiloxane composition according to the invention, may be produced by the attachment of an epoxy group to both ends of a paraffinic hydrocarbon chain (for example, diepoxy derived from butanediol) or of a polyether chain, such as α-ω-diepoxy polypropylene glycol. More exotic diepoxy resins suitable for said reaction include but are not limited to vinylcyclo hexene dioxide, 3,4-epoxycyclohexylmethyl 3,4-epoxycyclohexanemono carboxylate, 3-(3,4-epoxycyclohexyl)-8,9-epoxy-2,4-dioxaspiro-[5.5]undecane, bis(2,3-epoxycyclopentyl)ether, bis(3,4-epoxy-6-methylcyclohexyl) adipate and resorcinol diglycidyl ether. Other suitable epoxy resins can contain more than two epoxy functional groups per molecule, such as epoxidized soya oils, polyglycidyl ethers of phenolic resins of the novolak type, p-aminophenoltriglycidyl ether or 1,1,2,2-tetra(p-hydroxyphenyl)ethane tetraglycidyl ether. Another class of epoxy resins useful in forming the epoxy modified polysiloxane composition, comprises the epoxy polyethers obtained by reacting an epihalohydrin (such as epichlorohydrin or epibromohydrin) with a polyphenol in the presence of an alkali. Suitable polyphenols include resorcinol, catechol, hydroquinone, bis(4-hydroxyphenyl)-2,2-propane, i.e. bisphenol A; bis(4-hydroxyphenyl)-1,1-isobutane, 4,4-dihydroxybenzophenone; bis(4-hydroxyphenyl-1,1-ethane; bis(2-hydroxyphenyl)-methane; bis(4-hydroxyphenyl)-methane i.e. bisphenol F, and 1,5-hydroxynaphthalene. One very common polyepoxy is a polyglycidyl ether of a polyphenol, such as bisphenol A Another class of epoxy resin suitable for forming the epoxy modified polysiloxane composition comprises the hydrogenated epoxy resin based on bisphenol A such as Eponex 1510 from Resolution performance products. Other examples of suitable epoxy resins are the polyglycidyl ethers of polyhydric alcohols. These compounds may be derived from such polyhydric alcohols as ethylene glycol, diethylene glycol, triethylene glycol, 1,2-propylene glycol, 1,4-butylene glycol, 1,5-pentanediol, 1,2,6-hexane- triol, glycerol, trimethylolpropane, and bis(4-hydroxycyclohexyl)-2,2-propane. A detailed list of suitable epoxy compounds useful in forming the epoxy modified polysiloxane composition can be found in the handbooks A. M. Paquin, "Epoxidverbindungen und Harze" (Epoxide Compounds and Resins), Springer Verlag, Berlin 1958, Chapter IV and H. Lee and K. Neville, "Handbook of Epoxy Resins" MC Graw Hill Book Company, New York 1982 Reissue, as well as C. A. May, "Epoxy Resins-Chemistry and Technology", Marcel Dekker, Inc. New York and Basle, 1988.

More in particular the epoxy resins suitable for said epoxy modified polysiloxane composition are non-aromatic epoxy resins that contain more than one 1,2-epoxy groups per molecule. A preferred non-aromatic epoxy resin comprises two 1,2-epoxy groups per molecule. The epoxy resin is preferably in liquid rather than solid form, has an epoxy equivalent weight in the range of from about 100 to 5,000, and has a functionality of about two. In another embodiment, the epoxy resins suitable for said epoxy-polysiloxane composition are non-aromatic hydrogenated epoxy resins.

Suitable epoxy resins include but are not limited to non-aromatic diglycidyl ethers of cyclohexane dimethanol, bisphenol A diglycidyl ether, hydrogenated bisphenol A diglycidyl ether (DGEBA) type epoxy resins, such as Heloxy 107, Eponex 1510 and 1513 from Resolution performance products; Erisys GE-22, Epalloy 5000 and 5001 from CVC Specialty Chemicals; Polypox R11 from UPPC GmbH; Epo Tohto ST-1000 and ST-3000 from Tohto Kasel; Epodil 757 from Air Products; and Araldite DY-C, DY-0397 and DY-T from Vantico.

Other suitable non-aromatic epoxy resins include DER 732 and 736 from Dow Chemical; Heloxy 67, 68, 48, 84, 505 and 71 each from Resolution performance products; Erisys GE-20, GE-21, GE-23, GE-30, GE-31 and GE-60 from CVC Specialty Chemicals; Polypox R3, R14, R18, R19, R20 AND R21 from UPPC GmbH; aliphatic epoxy resins such as Araldite DY-T and DY-0397 from Vantico; ERL4221 from Union Carbide; and Aroflint 607 from Reichold Chemicals and bisphenol F diglycidyl ether type epoxy resin such as Epikote 862 from Resolution Performance Products and hydrogenated bisphenol F diglycidyl ether type epoxy resin such as Rütapox VE4261/R from Rutgers Bakelite.

A preferred epoxy modified polysiloxane composition comprises in the range of from 10 to 50% by weight epoxy resin. If the composition comprises less than about 10% by weight epoxy resin, chemical resistance of the coating will be compromised. If the composition comprises greater than about 50% by weight epoxy resin, the weatherability of the coating will be compromised. A particularly preferred composition comprises approximately 20% by weight epoxy resin.

In an embodiment, the epoxy modified polysiloxane composition may comprise polysiloxane/epoxy resins in a ratio ranging from 15/85 to 90/10 weight %, preferably from 40/60 to 70/30 weight %. In another embodiment, said composition may comprise polysiloxane/epoxy resins in a ratio of 58/42 weight %.

Examples of amino-hardener suitable for said composition include but are not limited to aliphatic, cycloaliphatic amine, aromatic, araliphatic amines, imidazoline group-containing polyaminoamides based on mono or polybasic acids, as well as adducts thereof. These compounds are part of the general state of the art and are described, inter alia, in Lee & Neville, "Handbook of Epoxy Resins", MC Graw Hill Book Company, 1987, chapter 6-1 to 10-19. More in particular, useful amino-hardener which can be added to the composition, include polyamines distinguished by the fact that they carry at least two primary amino groups, in each case bonded to an aliphatic carbon atom. It can also contain further secondary or tertiary amino groups. Suitable polyamines include polyaminoamides (from aliphatic diamines and aliphatic or aromatic dicarboxylic acids) and polyiminoalkylene-diamines and polyoxyethylene-polyamines, polyoxypropylene-polyamines and mixed polyoxyethylene/polyoxypropylene-polyamines, or amine adducts, such as amine-epoxy resin adducts. Said amines may contain 2 to 40 carbon atoms. For examples, the amines can be selected from polyoxyalkylene-polyamines and polyiminoalkylene-polyamines having 2 to 4 carbon atoms in the alkylene group, and have a number-average degree of polymerization of 2 to 100, other examples of amines can be linear, branched or cyclic aliphatic primary diaminoalkanes having 2 to 40 carbon atoms. In addition, said amines can be araliphatic amines having at least two primary amino groups, each of which are bonded to an aliphatic carbon atom.

A preferred amino hardener is a polyamine. More in particular said polyamine could be a polyoxyalkylenepolyamine hardener. More preferably, examples of polyoxyalkylene polyamine hardener have the following formula (2)

$$[H_2N\text{---}(R^5CHCH_2O)_x\text{---}]_yQ \tag{2}$$

wherein Q is the residue of an active hydrogen-containing polyvalent compound; each $R^5$ is independently hydrogen or alkyl; x is at least 1; and y is at least 2, provided that the average value for x is less than 10 for the low molecular weight polyoxyalkylene polyamine used.

The variables in said formula have the following meanings: Q is the residue of an active hydrogen-containing polyvalent compound used as an initiator. The valence of Q is given by y, wherein y is at least 2, preferably from 2 to 8, and most preferably 2 to 3. Each $R^5$ is independently hydrogen or alkyl, such as methyl or ethyl. The $R^5$ groups are preferably hydrogen and/or methyl, including mixtures. The average number of oxyalkylene repeating units per amine group, given by x, is at least 1, preferably from 1 to 100, and most preferably from 1.5 to 7. Preferably Q is residual alkyl, alkenyl, alkynyl, most preferably $C_{1-18}$ alkyl.

Typical oxyalkylene repeating units include oxyethylene, oxypropylene, oxybutylene, and so on, including mixtures thereof. When two or more oxyalkylenes are used, they may be present in any form, such as randomly or in blocks.

Examples of suitable polyoxyalkylene polyamine are polyoxyalkylenetriamines and polyoxyalkylenediamine. Examples of suitable polyoxyalkylenepolyamine are polyoxypropylenetriamine and polyoxypropylenediamine. Non-limiting examples of polyoxyalkylene polyamines include JEFFAMINE® polyoxyalkylene amines from HUNTSMAN, such as diamines D-230, D-400, D-2000 and D-4000, and triamines T-403, T-3000 and T-5000. According to a preferred embodiment the polyoxyalkylene polyamines are JEFFAMINE® T-403 (Huntsman) or JEFFAMINE® D230.

Several suitable polyoxyalkylene polyamines and their preparations are described in U.S. Pat. Nos. 5,391,826 and 4,766,245 hereby incorporated by reference.

In preparing epoxy modified polysiloxane compositions of the present invention, the proportion of hardener component to resin component can vary over a wide range, regardless of whether the hardener is chosen from the general classes of amines, or from the general formula (2), or any combination thereof. In general, the epoxy resin component is cured with sufficient hardener to provide at least from about 0.5 to 1.5 amine equivalent weight per 1 epoxy equivalent weight.

In another embodiment, the epoxy modified polysiloxane composition according to the invention may also comprise an epoxy-functional silane. Said epoxy-functional silane is useful as accelerator. Examples of such suitable epoxy functional silanes include but are not limited to glycidoxymethyltrimethoxysilane, 3-glycidoxypropyltrihydroxysilane, 3-glycidoxypropyldimethylhydroxysilane, 3-glycidoxypropyltrimethoxysilane, 3-glycidoxypropyltriethoxysilane, 3-glycidoxypropyldimethoxymethylsilane, 3-glycidoxypropyldimethylmethoxysilane, 3-glycidoxypropyltributoxysilane, 1,3-bis(glycidoxypropyl)tetramethyldisiloxane, 1,3-bis(glycidoxypropyl)tetramethoxydisiloxane, 1,3-bis(glycidoxypropyl)-1,3-dimethyl-1,3-dimethoxydisiloxane, 2,3-epoxypropyltrimethoxysilane, 3,4-epoxybutyltrimethoxysilane, 6,7-epoxyheptyitrimethoxysilans, 9,10-epoxydecyltrimethoxysilane, 1,3-bis(2,3-epoxypropyl)tetramethoxydisiloxane, 1,3-bis(6,7-ethoxyheptyl)tetramethoxydisiloxane, 2-(3,4-epoxycyclohexyl)ethyltrimethoxysilane, and the like.

Epoxy modified polysiloxane compositions of this invention may also contain other components such as rheological modifiers, plasticizers, thixotropic agents, adhesion promoters, antifoam agents and solvents and the like to achieve the desired properties sought by the user.

Epoxy modified polysiloxane compositions of this invention are formulated for application with conventional air, airless, air-assisted airless and electrostatic spray equipment, brush, or roller. The compositions are intended to be used as protective coatings for steel, galvanized steel, aluminum, concrete and other substrates at dry film thickness in the range of from about 50 μm to about 500 μm.

Suitable pigments may be selected from organic and inorganic pigments which may include titanium dioxide, carbon black, lampblack, zinc oxide, natural and synthetic red, yellow, brown and black iron oxides, toluidine and benzidine yellow, phthalocyanine blue and green, and carbazole violet, and extender pigments including ground and crystalline silica, barium sulfate, magnesium silicate, calcium silicate, mica, micaceous iron oxide, calcium carbonate, zinc powder, aluminum and aluminum silicate, gypsum, feldspar and the like. The amount of pigment that is used to form the composition is understood to vary, depending on the particular composition application, and can be zero when a clear composition is desired. A preferred epoxy-polysiloxane composition may comprise up to about 50% by weight fine particle size pigment and/or filler. Depending on the particular end use, a preferred coating composition may comprise approximately 25% by weight fine particle size filler and/or pigment. More in particular said pigment or filler material having a fine particle size selected from the group comprising organic and inorganic pigments, wherein at least 90% by weight of the pigment is being smaller than 40 microns particle size.

The pigment and/or filler ingredient is typically added to the epoxy resin portion of the resin component and is dispersed with a high speed dissolver mixer to at least 50 μm fineness of grind, or alternatively is ball milled or sand milled to the same fineness of grind. Selection of a fine particle size pigment or filler and dispersion or milling to about 50 μm grind allows for the atomization of mixed resin and cure components with conventional air, air-assisted airless, airless and electrostatic spray equipment, and provides a smooth, uniform surface appearance after application.

The presence of water during curing is an important requirement of the present invention and water should be present in an amount sufficient to bring about both the hydrolysis of the polysiloxane and the subsequent condensation of the formed silanols. The sources of water are mainly atmospheric humidity and adsorbed moisture on the pigment or filler material. In addition, the amino hardener may contain or attract additional amounts of water. Additional water may be added to accelerate cure depending on ambient conditions, such as the use of the coating composition in arid environments. A preferred epoxy modified polysiloxane composition comprises up to a stoichiometric amount of water to facilitate hydrolysis.

If desired, water may be added to either the epoxy resin or the amino hardener. Other sources of water may include trace amounts present in the epoxy resin, the amino hardener, thinning solvent, or other ingredients. Regardless of its source, the total amount of water that is used should be the stoichiometric amount needed to facilitate the hydrolysis reaction. Water exceeding the stoichiometric amount is undesirable since excess water acts to reduce the surface gloss of the finally-cured composition product.

Up to about 5% by weight catalyst may be added to the resin component, or may be added as an entirely separate component, to speed drying and curing of the epoxy modified polysiloxane compositions of the present invention. Useful catalysts include metal driers well known in the paint industry, e.g. zinc, manganese, zirconium, titanium, cobalt, iron, lead and tin containing driers. Suitable catalysts include organotin catalysts having the general formula (3):

(3)

wherein $R^6$ and $R^7$ are each independently selected from the group comprising alkyl, aryl, and alkoxy radicals having up to eleven carbon atoms, and wherein $R^8$ and $R^9$ are each independently selected from the same groups as $R^6$ and $R^7$, or from the group comprising inorganic atoms such as halogens, sulfur or oxygen. Dibutyl tin dilaurate, dibutyl tin diacetate, organotitanates, sodium acetate, and aliphatic secondary or tertiary polyamines including propylamine, ethylamino ethanol, triethanolamine, triethylamine, and methyl diethanol amine may be used alone or in combination to accelerate hydrolytic polycondensation of polysiloxane. A preferred catalyst is dibutyl tin dilaurate.

Other suitable catalysts include acids such as organic acids, inorganic acids, organic sulfonic acids, esters of sulfuric acid and superacids. Organic acids include acetic acid, formic acid and the like. Inorganic acids include sulfuric acid, hydrochloric acid, perchloric acid, nitric acid, phosphoric acid, and the like. Organic sulfonic acids include both aromatic and aliphatic sulfonic acids. Representative sulfonic acids that are commercially available include methanesulfonic, trifluoromethanesulfonic, benzenesulfonic, dodecylbenzenesulfonic, dodecyldiphenyloxide sulfonic, 5-methyl-1-naphthylenesulfonic, and p-toluenesulfonic acid, sulfonated polystyrene, and the sulfonates derived from polytetrafluoroethylenes. Superacids suitable as catalysts are described in G. A. Olah, G. K. S. Prakash, and J. Sommer, Superacids, John Wiley & Sons: New York, 1985. Useful superacids include perchloric, fluorosulfuric, trifluoromethanesulfonic, and perfluoroalkylsulfonic acids. They also include Lewis superacids such as $SbF_5$, $TaF_5$, $NbF_5$, $PF_5$, and $BF_3$. Superacids also include hydrogen fluoride in combination with fluorinated Lewis acids such as $SbF_5$, $TaF_5$, $NbF_5$, $PF_5$, and $BF_3$. They also include oxygenated Bronsted acids such as sulfuric, fluorosulfuric, trifluoromethanesulfonic, and perfluoroalkylsulfonic acid in combination with Lewis acids such as $SbF_5$, $TaF_5$, $NbF_5$, $PF_5$, and $BF_3$.

Other examples of suitable catalysts include nitrate of a polyvalent metal ion such as calcium nitrate, magnesium nitrate, aluminum nitrate, zinc nitrate, or strontium nitrate.

Epoxy modified polysiloxane compositions of the present invention are generally low in viscosity and can be spray applied without the addition of a solvent. However, organic solvents may be added to improve atomization and application with electrostatic spray equipment or to improve flow, leveling, and appearance when applied by brush, roller, or standard air and airless spray equipment. Exemplary solvents useful for this purpose include aromatic hydrocarbons, esters, ethers, alcohols, ketones, glycol ethers and the like. The amount of solvent added to compositions of the present invention preferably is less than 250 grams per liter and more preferably less than about 120 grams per liter.

Epoxy modified polysiloxane compositions of the present invention may also contain rheological modifiers, plasticizers, antifoam agents, thixotropic agents, pigment wetting agents, adhesion promoters, anti-settling agents, diluents, UV light stabilizers, air release agents and dispersing aids. A preferred epoxy modified polysiloxane composition may comprise up to about 10% by weight such modifiers and agents.

Epoxy modified polysiloxane compositions of the present invention can be supplied as a two-package system in moisture proof containers. One package contains the epoxy resin, polysiloxane, any pigment and/or filler ingredient, optionally catalysts, additives and solvent if desired. The second package contains a polyamine and/or adducts of polyamines and optionally catalysts, solvents and additives.

Epoxy modified polysiloxane compositions of the present invention can be applied and fully cure at ambient temperature conditions in the range of from about −10° C. to 50° C. At temperatures below 0° C. absence of water has a strong influence on the curing speed and also on the final properties of the coating. However, compositions of the present invention may be cured by additional heating.

The present invention further relates to methods for the preparation of epoxy modified polysiloxane compositions according to the invention, comprising the steps of combining a polysiloxane of formula (1) as described above; with an epoxy resin having more than one 1,2-epoxy groups per molecule with an epoxy equivalent weight in the range of from 100 to about 5,000; a sufficient amount of an amino hardener component having active hydrogens, preferably at least two active hydrogens, optionally a catalyst such as an organotin catalyst; and a sufficient amount of water to facilitate hydrolysis and polycondensation reactions to form the fully-cured cross-linked epoxy modified polysiloxane polymer composition at ambient temperature. Preferably, the amino hardener provides in the range of from 0.5 to 1.5 amine equivalent weight per one epoxy equivalent weight. According to an embodiment said polysiloxane is selected from the group comprising alkoxy- and silanol-functional polysiloxanes having a molecular weight in the range of from about 400 to 10,000.

Optionally, other components may be combined to the ingredient of the composition such as organo-functional polysiloxanes, epoxy functional silanes, other adhesion promoters, rheological modifiers, plasticizers, thixotropic agents, antifoam agents and solvents and the like.

The present invention further encompasses a substrate provided with at least one layer of a cured network of epoxy modified polysiloxane polymer composition according to the invention.

The present invention further relates to a method for making a fully-cured thermosetting epoxy modified polysiloxane composition according to the invention comprising the steps of:

forming a base component by combining an epoxy resin as described above; a polysiloxane of formula (1) as described above, and curing the base component at ambient temperature by adding thereto: an amino hardener with active hydrogens, preferably at least two active hydrogens, able to react with epoxy groups in the epoxy resin to form polymers containing hydroxyl groups, which are able to react with the silanol groups of hydrolyzed polysiloxane to form a polymer network, wherein the epoxy chain polymers and polysiloxane polymers polymerize to form a fully-cured epoxy modified polysiloxane polymer composition and optionally a catalyst such as an organotin catalyst to facilitate curing the base component at ambient temperature.

In another embodiment, said polysiloxane is selected from the group comprising alkoxy- and silanol-functional polysiloxanes having a molecular weight in the range of from 400 to 10,000.

While not wishing to be bound by any particular theory, it is believed that epoxy modified polysiloxane compositions of the present invention are cured by: (1) the reaction of the epoxy resin with the amine and/or polyoxyalkylenepolyamine hardener to form epoxy polymer chains; (2) the hydrolytic polycondensation of the polysiloxane ingredient to produce the alcohol analog and polysiloxane polymer; and (3) the copolymerization of the epoxy polymer chains with the polysiloxane polymer. This copolymerization reaction is believed to take place via the condensation reaction of silanol groups of hydrolyzed polysiloxane (polymer) with silanol and hydroxyl groups in the epoxy polymer chains. Eventually a fully-cured epoxy modified polysiloxane polymer coating is formed. In its cured form, the epoxy modified polysiloxane coating exists as a uniformly dispersed arrangement of a continuous polysiloxane polymer matrix intertwined with epoxy polymer chain fragments that are cross-linked with the polysiloxane polymer matrix, thereby forming a polymer network chemical structure that has substantial advantages over conventional polysiloxane systems.

The compositions according to the invention are compatible with suitable dispenser tinting systems, and permit the supply of large variety of color easily.

Pigmentation of these compositions may be generally done with normal light fast paint pigments, and for specific conditions, glass-flake addition can be considered to further reduce water permeation and to extend service life.

These compositions can find various industrial applications because of their favorable properties such as a long pot life in combination with reasonably fast curing times, even under high atmospheric humidity. Typical industrial applications for said compositions include, for example, use for the production of shaped articles (casting resins) for tool construction, or for the production of coatings and/or intermediate coatings on many types of substrates, for example, on those of an organic or inorganic nature, such as textiles of natural or synthetic origin, plastics, glass, ceramic and building materials, such as concrete, fiberboards and artificial stones, but in particular on metals, such as optionally pretreated sheet steel, cast iron, aluminum and nonferrous metals, such as brass, bronze and copper.

The compositions according to the invention can furthermore be employed as constituents of adhesives, putties, laminating resins and synthetic resin cements, and in particular as constituents of paints and coatings for coating industrial objects, domestic appliances and furniture and in the shipbuilding industry, land storage tanks and pipelines and in the building industry, such as, for example, refrigerators, washing machines, electrical appliances, windows and doors.

These coatings can be applied, for example by brushing, spraying, rolling, dipping and the like. A particularly preferred field of use for the coatings according to the invention is paint formulations.

The compositions according to the invention constitute a mainly, but not exclusively, network compositions for low VOC, NISO finish applications. This network is being formed after application and during ambient curing by combining a moisture curing polysiloxane modified with a suitable amount of amine cured epoxy polymer. Modifications of these compositions with other binder polymers are possible as well. These compositions result in coatings with a combination of gloss and color retention close to a conventional polysiloxane but with unexpected additional strength and flexibility which tolerates high film built applications on complex structures without cracking tendency.

These and other features of the present invention will become more apparent upon consideration of the following examples and figures.

EXAMPLES 1

Figure 1:
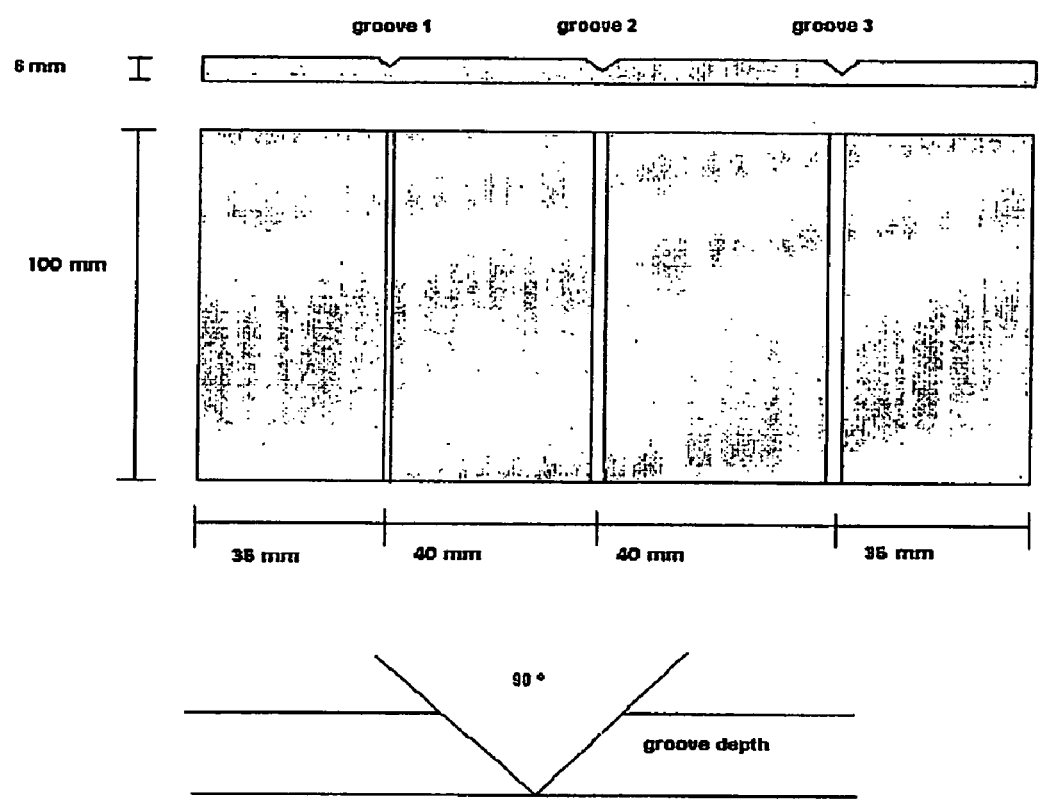
FIG. 1 shows the design of the groove panel for the cracking resistance test of a coated steel device.

Preparation of the Epoxy-modified Polysiloxane Compositions According to the Invention In order to prepare the epoxy modified polysiloxane compositions according to the invention, a polysiloxane of formula (1) with a molecular weight around 1400 g/mol were combined in diverse ratios with different epoxy resins:
Bisphenol A epoxy resin
Bisphenol F epoxy resin
Hydrogenated bisphenol A epoxy resin
Hydrogenated bisphenol F epoxy resin These combinations were cured with amines such as Jeffamines in pure or prereacted form (adduct form to reduce the volatility).

The epoxy modified polysiloxane compositions according to the invention have been prepared according to the method described hereunder (preparation of coating 6).

A pigmented base component is prepared by combining 240 grams of hydrogenated bisphenol A epoxy resin (epoxy eq. wt.=210–238 g/eq), 135 grams of a polysiloxane (for example DC-3074), 5 grams of a thixotrope agent, 5 grams of a defoamer and 415 grams of titanium dioxide. These ingredients were mixed in a 1 liter can and dispersed to a fineness of grind smaller than 40 μm with a dissolver. Temperature of the mixture is allowed to rise to 65° C. and is kept constant at this temperature for approximately 10 minutes in order to allow the thixotrope agent to be activated.

The mixture is then cooled to 40° C. before adding 225 grams of a polysiloxane (for example DC-3074). Thereupon the mixture is homogenized with a high-speed dissolver and finally 15 grams of a light stabilizer, 20 grams of a catalyst, 25 grams of xylene and 50 grams of an epoxy-functional silane (such as γ-glycidoxypropyltrimethoxysilane) are mixed in. The final mixture has a theoretical epoxy equivalent weight (EEW) of 873 grams per equivalent. Table 1 shows the ingredients used in the coatings according to the invention.

TABLE 1

| Compositions | Weight (grams) | | | | | | | | |
|---|---|---|---|---|---|---|---|---|---|
| Coating number | 1 | 2 | 3 | 4 | 5 | 6 | 7 | 8 | 9 |
| Pigmented base component | | | | | | | | | |
| Bisphenol A epoxy resin, EEW = 183–189 g/eq | 60 | — | — | — | 24 | — | — | — | — |
| Hydrogenated Bis. A epoxy resin, EEW = 210–238 g/eq | — | 60 | — | — | — | 24 | 42 | — | — |
| Bisphenol F epoxy resin, EEW = 164–173 g/eq | — | — | 60 | — | — | — | — | 24 | — |
| Hydrogenated bisphenol F epoxy resin | — | — | — | 60 | — | — | — | — | 24 |
| Thixotrope agent | 0.5 | 0.5 | 0.5 | 0.5 | 0.5 | 0.5 | 0.5 | 0.5 | 0.5 |
| Defoamer | 0.5 | 0.5 | 0.5 | 0.5 | 0.5 | 0.5 | 0.5 | 0.5 | 0.5 |
| Titanium dioxide | 38 | 40 | 38 | 38 | 41.5 | 41.5 | 43 | 40.5 | 40.5 |
| Dow Corning 3074 | — | — | — | — | 36 | 36 | 18 | 36 | 36 |
| Light stabilizer, HALS | 1.5 | 1.5 | 1.5 | 1.5 | 1.5 | 1.5 | 1.5 | 1.5 | 1.5 |
| Catalyst | — | — | — | — | 2 | 2 | 1 | 2 | 2 |
| Xylene | 16.5 | 12.5 | 10.5 | 9.5 | 5 | 4 | 8 | 3 | 3 |
| Epoxy-functional silane | — | — | — | — | 5 | 5 | 5 | 5 | 5 |
| EEW [g/eq.] | 371 | 416 | 313 | 367 | 786 | 873 | 557 | 692 | 800 |
| Hardener component | | | | | | | | | |
| Jeffamine T-403 | 25.5 | 22.4 | 28.8 | 24.3 | 11.9 | 10.7 | 17.4 | 13.3 | 11.4 |
| AHEW [g/eq.] | 81 | 81 | 81 | 81 | 81 | 81 | 81 | 81 | 81 |

EXAMPLE 2

General Properties of the Coatings According to the Invention

Each epoxy modified polysiloxane composition was air-spray applied to a suitable test panel. The coatings were left to cure fully at room temperature for 2 weeks before being tested. After this curing period, the coatings were tested for relevant properties. The epoxy modified polysiloxane coatings according to the invention (1-11) were tested and compared against a comparative example. It is a commercial coating from Ameron sold under the name of Ameron PSX 700 comprising a polysiloxane, hydrogenated bisphenol A epoxy resin and an amino-silane as a hardener.

To simulate the cracking behavior of a coating on complex structures with potentially over-thickness a cracking resistance test was developed: In order to test the cracking resistance, "groove panels" were developed. The steel panel is 2.5 SA gritblasted and fitted with 3 grooves with a depth of respectively 0.8 mm, 1.4 mm and 2.0 mm. The design of the groove panel is shown in FIG. 1. A coating is applied onto the groove panel. First, the grooves are filled with the paint using a disposable plastic pipette and the superfluous paint in the grooves is removed using a putty-knife. Then a layer of the paint with approximately 1.5 times the recommended film thickness is applied by air-spray.

After two weeks curing at room temperature the panel is put in a temperature cabinet and exposed to the following cycle:
18 hrs at 60° C.
In 1 h from 60° C. to −5° C.
4 hrs at −5° C.
In 1 h from −5° C. to 60° C.

The panel is exposed during 84 cycles and checked every 7 cycles for crack formation during this period. Reporting after 84 cycles.
0=OK, no cracking
1=1 groove shows cracking
2=2 grooves show cracking
3=3 grooves show cracking The general properties obtained with the coating (1–9) are discussed hereunder. The results are illustrated in Table 2.

Figure 2:
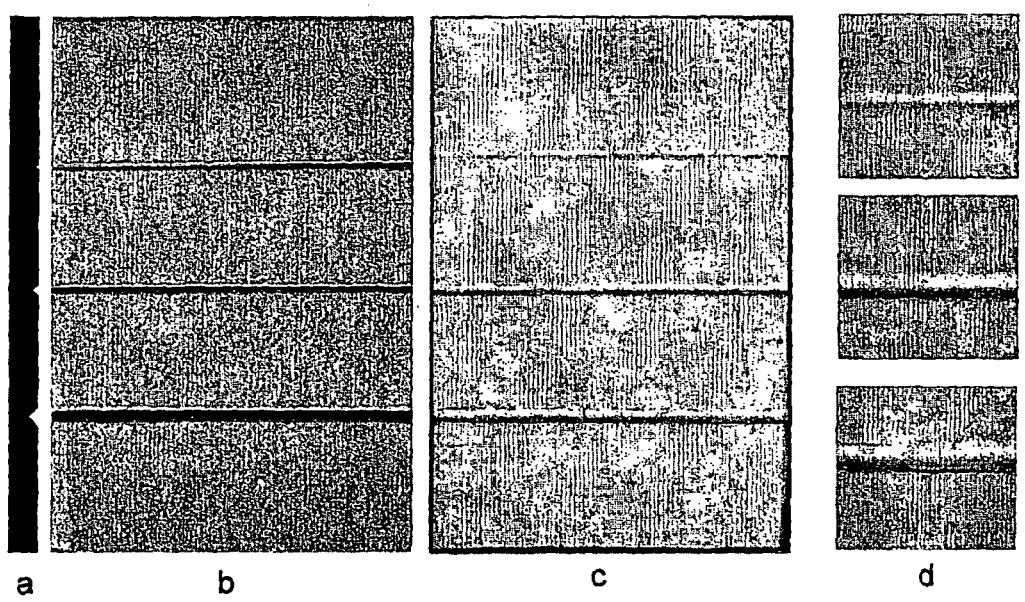
FIG. 2 represents a picture of a groove panel for the cracking resistance test. Pane 2a shows the thickness profile of the steel panels for cracking tests in relation with shape and depth of the grooves. Pane 2b shows the appearance of a SA 2.5 grit blasted groove panel. Pane 2c shows a panel coated with a comparative coating after exposure with cracking defects on the grooves. Pane 2d shows details of the cracking at the grooves in relation with groove depth.

The coatings according to the invention have a very good flexibility while the comparative example shows cracking, as illustrated on FIG. 2 (panes 2c and 2d).

With regard to the VOC content, all the coatings according to the invention have values far below the 250 g/liter limit.

The coatings according to the invention, due to their high solid content, can be applied with airless spraying in a minimum wet film thickness range of 80–150 μm.

They have pot lives longer than 4 hours at ambient temperature. They show a good balance for Atlantic and tropical use.

The dry to handle time after application at room temperature of the coatings according to the invention is comparable to the comparative coating. Furthermore, they present no surface defects and high gloss and they show good cracking resistance to local overthickness.

The coatings according to the invention show good resistance to chemicals/reagents.

The coatings according to the invention have very good gloss and color retention and presents additional features such as flexibility, cracking resistance and good compatibility with existing tinting systems.

Epoxy modified polysiloxane coatings of the present invention have the advantage of being NISO compositions which exhibit an unexpected and surprising improvement in mechanical cohesive strength while introducing a high degree of flexibility which makes it possible to apply this class of coatings on complex steel structures with limited risk of cracking.

Moreover, the coatings according to the invention showed unexpected long pot life and good curing properties resulting in enough flexibility, low stress and enabling easy application. Furthermore, these coatings exhibit a good cracking resistance. Due to their high solid content, low solvent emission is observed for these coatings.

What is claimed is:

1. An epoxy modified polysiloxane composition obtainable by combining the following ingredients:
    a polysiloxane of formula (1), wherein each $R^1$ is independently selected from the group consisting of hydroxy, alkyl, aryl and alkoxy radicals having up to six carbon atoms, each $R^2$ is independently selected from the group consisting of hydrogen, alkyl and aryl radicals having up to six carbon atoms and, wherein n is selected so that the molecular weight for the polysiloxane is in the range of from about 400 to 10,000; with

TABLE 2

| Coatings | 1 | 2 | 3 | 4 | 5 | 6 | 7 | 8 | 9 | Comp. coating |
|---|---|---|---|---|---|---|---|---|---|---|
| VOC [g/L] | 150 | 120 | 100 | 100 | 100 | 90 | 100 | 80 | 80 | 120 |
| Pot life @ 20° C. [hrs.] | 4 | 8 | 4 | 8 | 6 | 6 | 6 | 6 | 6 | 4 |
| Drying at 20° C., 50% RH | | | | | | | | | | |
| dry to handle [hrs.] | 8 | 16 | 8 | 16 | 10 | 10 | 10 | 10 | 10 | 8 |
| surface defects | No | No | No | No | No | No | No | No | No | No |
| Initial gloss [%, 60°] | 90 | 90 | 90 | 90 | 90 | 90 | 91 | 92 | 92 | 90 |
| Drying at 20° C., 90% RH | | | | | | | | | | |
| dry to handle [hrs.] | 8 | 16 | 8 | 16 | 8 | 8 | 8 | 8 | 8 | 6 |
| surface defects | No | No | No | No | No | No | No | No | No | No |
| Flexibility | | | | | | | | | | |
| cracking test after 84 cycles | 0 | 0 | 0 | 0 | 0 | 0 | 0 | 0 | 0 | 2 |

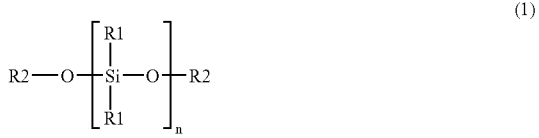

an epoxy resin having more than one 1,2-epoxy groups per molecule with an epoxy equivalent weight in the range of from 100 to about 5,000; and a polyoxyalkylenepolyamine hardener of formula (2)

wherein Q is the residue of an active hydrogen-containing polyvalent compound; each $R^5$ is independently hydrogen or alkyl; x is at least 1; and y is at least 2, provided that the average value for x is less than 10 for the low molecular weight polyoxyalkylene polyamine, said hardener having active hydrogens able to react with epoxy groups in the epoxy resin to form polymers containing hydroxyl groups, which are able to react with the silanol groups of hydrolyzed polysiloxane to form a polymer network, wherein the epoxy chain polymers and polysiloxane polymers polymerize to form a cured epoxy modified polysiloxane polymer composition.

2. The composition according to claim 1, wherein the polysiloxane of formula (1) is an alkoxy-functional polysiloxane or a silanol-functional polysiloxane.

3. The composition according to claim 1, wherein said composition comprises an organo-functional polysiloxane.

4. The composition according to claim 1, wherein said composition comprises an epoxy-functional silane.

5. The composition according to claim 1, wherein the polyoxyalkylenepolyamine is a polyoxyalkylenetriamine or a polyoxyalkylenediamine.

6. The composition according to claim 1, wherein the polyoxyalkylenepolyamine is a polyoxypropylenetriamine or a polyoxypropylenediamine.

7. The composition according to claim 1, wherein the epoxy resin is a non-aromatic epoxy resin.

8. The composition according to claim 7, wherein the epoxy resin is a hydrogenated non-aromatic epoxy resin.

9. The composition according to claim 7, wherein the non-aromatic epoxy resin is selected from the group of cycloaliphatic epoxy resins comprising diglycidyl ethers of cyclohexane dimethanol and diglycidyl ethers of hydrogenated bisphenol A epoxy resins.

10. The composition according to claim 1, wherein the composition additionally comprises at least one metal catalyst to facilitate cure at ambient temperature, wherein the catalyst is selected from the group consisting of zinc, manganese, zirconium, titanium, cobalt, iron, lead, and tin containing driers.

11. The composition according to claim 1, comprising at least one additional ingredient selected from the group consisting of rheological modifiers, plasticizers, antifoam agents, thixotropic agents, pigment wetting agents, adhesion promoters, anti-settling agents, diluents, UV light stabilizers, air release agents, dispersing aids, and mixtures thereof.

12. The composition according to claim 1, further comprising a pigment or filler material having a fine particle size selected from the group consisting of organic and inorganic pigments, wherein at least 90% by weight of the pigment being smaller than 40 microns particle size.

13. The composition according to claim 1 comprising in the range of from about 10 to 80% by weight polysiloxane, 10 to 50% by weight of the epoxy resin ingredient, and a stoichiometric amount of the amine hardener from 0.5 to 1.5 relative to the epoxy groups.

14. The composition according to claim 1, wherein the polysiloxane/epoxy resins are in a ratio ranging from 15/85 to 90/10 weight %.

15. The composition according to claim 14, wherein the polysiloxane/epoxy resins are in a ratio ranging from 40/60 to 70/30 weight %.

16. A method for the preparation of an epoxy modified polysiloxane polymer composition according to claim 1 comprising the step of combining:

a polysiloxane of formula (1), wherein each $R^1$ is independently selected from the group consisting of hydroxy, alkyl, aryl and alkoxy radicals having up to six carbon atoms, each $R^2$ is independently selected from the group consisting of hydrogen, alkyl and aryl radicals having up to six carbon atoms and, wherein n is selected so that the molecular weight for the polysiloxane is in the range of from about 400 to 10,000; with

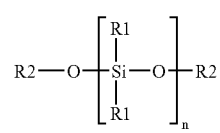

an epoxy resin having more than one 1,2-epoxy groups per molecule with an epoxy equivalent weight in the range of from 100 to about 5,000;

a sufficient amount of an a polyoxyalkylenepolyamine hardener of formula (2)

wherein Q is the residue of an active hydrogen-containing polyvalent compound; each $R^5$ is independently hydrogen or alkyl; x is at least 1; and y is at least 2, provided that the average value for x is less than 10 for the low molecular weight polyoxyalkylene polyamine, said hardener having active hydrogens; and a sufficient amount of water to facilitate hydrolysis and polycondensation reactions to form the fully-cured cross-linked epoxy modified polysiloxane polymer composition at ambient temperature.

17. The method according to claim 16, wherein said polysiloxane is selected from the group consisting of alkoxy- and silanol-functional polysiloxanes having a molecular weight in the range of from about 400 to 10,000.

18. A substrate provided with at least one layer of a cured epoxy modified polysiloxane composition according to claim 1.

19. A method for making a fully-cured thermosetting epoxy modified polysiloxane composition according to claim 1 comprising the steps of:

forming a base component by combining:

an epoxy resin having more than one 1,2-epoxy groups per molecule with an epoxy equivalent weight in the range of from 100 to about 5,000;

a polysiloxane of formula (1), wherein each $R^1$ is independently selected from the group consisting of hydroxy, alkyl, aryl and alkoxy radicals having up to six carbon atoms, each $R^2$ is independently selected from the group consisting of hydrogen, alkyl and aryl radicals having up to six carbon atoms and, wherein n is selected so that the molecular weight for the polysiloxane is in the range of from about 400 to 10,000; with

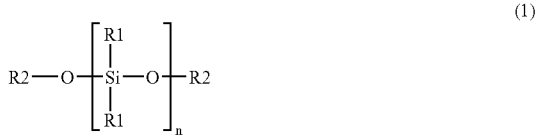

curing the base component at ambient temperature by adding thereto:

a polyoxyalkylenepolyamine hardener of formula (2)

wherein Q is the residue of an active hydrogen-containing polyvalent compound; each $R^5$ is independently hydrogen or alkyl; x is at least 1; and y is at least 2, provided that the average value for x is less than 10 for the low molecular weight polyoxyalkylene polyamine, said hardener having active hydrogens able to react with epoxy groups in the epoxy resin to form polymers containing hydroxyl groups, which are able to react with the silanol groups of hydrolyzed polysiloxane to form a polymer network, wherein the epoxy chain polymers and polysiloxane polymers polymerize to form a cured epoxy modified polysiloxane polymer composition.

20. The method according to claim 19, wherein said polysiloxane is selected from the group consisting of alkoxy- and silanol-functional polysiloxanes having a molecular weight in the range of from 400 to 10,000.

21. The composition according to claim 13, further comprising up to about 5% by weight catalyst.

22. The composition according to claim 15, wherein the polysiloxane/epoxy resins are in a ratio of about 58/42 weight %.

23. The method according to claim 16, wherein the combining step further comprises adding a catalyst.

24. The method according to claim 19, further comprising adding a catalyst to facilitate curing the base component at ambient temperature.

* * * * *

UNITED STATES PATENT AND TRADEMARK OFFICE
CERTIFICATE OF CORRECTION

PATENT NO. : 7,125,609 B2
APPLICATION NO. : 10/513090
DATED : October 24, 2006
INVENTOR(S) : Klaassens et al.

It is certified that error appears in the above-identified patent and that said Letters Patent is hereby corrected as shown below:

Column 1, Lines 9-10, "Application PCT/EPO3/04514" should be changed to

--Application PCT/EP03/04514--

Column 3, Line 57, "aminolsobutylene" should be changed to --aminoisobutylene--

Column 5, Lines 21-22, "the organ-functional" should be changed to --the organo-functional--

Column 5, Lines 25-26, "—O—$R_3$—$(X)_z$" should be changed to -- —O—$R^3$—$(X)_z$ --

Column 6, Line 51, "such as bisphenol A" should be changed to --such as bisphenol A.--

Column 7, Line 21, "from Tohto Kasel;" should be changed to --from Tohto Kasei;--

Column 15, Table 2, next to last line, "crackIng test" should be changed to --cracking test--

Column 9, Lines 5-6, 3-glycidoxypropytributoxysilane," should be changed to

--3-glycidoxypropyltributoxysilane--

Column 9, Line 10, "6,7-epoxyheptyitrimethoxysilans," should be changed to

--6,7-epoxyheptyltrimethoxysilane,--

UNITED STATES PATENT AND TRADEMARK OFFICE
CERTIFICATE OF CORRECTION

PATENT NO. : 7,125,609 B2
APPLICATION NO. : 10/513090
DATED : October 24, 2006
INVENTOR(S) : Klaassens et al.

It is certified that error appears in the above-identified patent and that said Letters Patent is hereby corrected as shown below:

Column 9, Line 12, "1,3-bis(6,7-ethoxyheptyl)" should be changed to

--1,3-bis(6,7-epoxyheptyl)--

Signed and Sealed this

Third Day of April, 2007

JON W. DUDAS
*Director of the United States Patent and Trademark Office*